(12) United States Patent
Mukai et al.

(10) Patent No.: US 7,816,835 B2
(45) Date of Patent: Oct. 19, 2010

(54) TANDEM AC GENERATOR FOR VEHICLE AND METHOD OF PRODUCING BRUSH ASSEMBLY THEREOF

(75) Inventors: Takuzou Mukai, Handa (JP); Akiya Shichijoh, Yatomi (JP); Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 642 days.

(21) Appl. No.: 11/727,337

(22) Filed: Mar. 26, 2007

(65) Prior Publication Data
US 2007/0241632 A1 Oct. 18, 2007

(30) Foreign Application Priority Data
Apr. 14, 2006 (JP) ............... 2006-112203

(51) Int. Cl.
*H01R 39/38* (2006.01)
*H02K 13/00* (2006.01)
*H02K 16/00* (2006.01)
(52) U.S. Cl. .......... 310/242; 310/239; 310/114
(58) Field of Classification Search .......... 310/114, 310/263, 238–249
See application file for complete search history.

(56) References Cited

U.S. PATENT DOCUMENTS
6,011,341 A * 1/2000 Toya et al. ............ 310/239
6,750,585 B2 * 6/2004 You ....................... 310/239

FOREIGN PATENT DOCUMENTS
| FR | 2723481 A1 | * | 2/1996 |
| JP | 05083898 A | * | 4/1993 |
| JP | A-05-083906 | | 4/1993 |
| JP | A-05-137295 | | 6/1993 |

OTHER PUBLICATIONS
JP 05083898 Translated Abstract-1993.*
JP 05083898 Machine Translation (1993).*
FR 2723481 Machine Translation (1996).*
Chinese Office Action issued Jan. 8, 2010 in corresponding Chinese Patent Application No. 2007100794839.

* cited by examiner

*Primary Examiner*—Quyen Leung
*Assistant Examiner*—Eric Johnson
(74) *Attorney, Agent, or Firm*—Oliff & Berridge, PLC

(57) ABSTRACT

A brush holder in a tandem vehicle alternator for a vehicle is composed mainly of a primary brush holder and a secondary brush holder accommodating plural brushes, respectively. The primary and secondary brush holders are independently formed. During a step of producing a brush assembly and of mounting the brush assembly on the tandem vehicle alternator, both of the primary and secondary brush holders are integrated into a single brush holder and tightly fastened by welding using a connection metal member.

10 Claims, 7 Drawing Sheets

TANDEM AC GENERATOR FOR VEHICLE AND METHOD OF PRODUCING BRUSH ASSEMBLY THEREOF

CROSS-REFERENCE TO RELATED APPLICATION

This application is related to and claims priority from Japanese Patent Application No. 2006-112203 filed on Apr. 14, 2006, the contents of which are hereby incorporated by reference.

BACKGROUND OF THE INVENTION

1. Field of the Invention

The present invention relates to a tandem AC generator composed of dual Lundell type rotors for vehicle (hereinafter, also referred to as "a tandem vehicle alternator" through the specification for short) having an improved brush structure and a method of producing a brush assembly of the tandem vehicle alternator.

2. Description of the Related Art

For example, there are various related-art techniques relating to a tandem vehicle alternator having a configuration in which a pair of Lundell-type rotors is placed in series (in a tandem connection) and each Lundell-type rotor generates and supplies an output voltage which is controlled independently. For example, Japanese patent laid open publications, No. JP-H5-83906 and No. JP-H5-137295 have disclosed such a tandem vehicle alternator. As has been well known, such a tandem vehicle alternator is equipped with a common-use slip ring and a pair of slip rings in order to supply electric power to exciting winding of the pair of the Lundell type rotors. The tandem vehicle alternator of the related art usually uses the common-use slip ring as commonly used and the pair of independent-use slip rings as used independently in order to reduce the size of the rotor along the axis direction or a longitudinal direction of a rotary shaft of the rotor, and through the slip rings the electric power is supplied to a pair of field windings in the pair of the rotors.

In such a configuration of the related art tandem vehicle alternator, because a current density is increased by an electric power supply mechanism which is commonly used by the pair of the rotors and which is composed of the common-use slip ring and a brush contacted to the common-use slip ring, the related art techniques have proposed a configuration in which the pair of the brushes is placed in a circumference direction of the slip ring. This mechanism will be also referred to as "the brush mechanism in which plural brushes are placed along a circumference direction of a slip ring".

However, because such a brush mechanism of placing plural brushes along a circumference direction of a slip ring takes a complicated configuration of a brush assembly and requires complicated assembling work for assembling the brush assembly, and thereby needs a drastic change to brush assembling equipments. Those matters increase the manufacturing cost of a tandem vehicle alternator in addition to the reason of being a relatively low number of the tandem vehicle alternators to be produced. As a result, the tandem vehicle alternator of the related art has a drawback, namely, increases its manufacturing cost when compared with a general purpose vehicle alternator.

SUMMARY OF THE INVENTION

It is an object of the present invention to provide a tandem AC generator for vehicle having an improved brush structure with a compact size and a method of easily producing a brush assembly of the tandem AC generator for vehicle.

To achieve the above purposes, the present invention provides a tandem AC generator for vehicle having primary and secondary brushes, a brush holder, primary and secondary brush springs, and terminals. The primary and secondary brushes are slidingly contacted to a common slip ring and placed near to each other in a circumference direction of the common slip ring. The brush holder has primary and secondary brush holders separated to each other and independently accommodating and supporting the primary and secondary brushes so as to move the primary and secondary brushes in a radius direction of the slip ring, and integrated in a single body by a connection metal member. Both ends of the connection metal member are insert-molded in the primary and secondary brush holders, respectively. The primary and secondary brush springs, accommodated in the brush holder, spring-bias those spring-energy to the primary and secondary brushes, independently, toward the radius direction of the slip ring. The terminals are fixed to the primary and secondary brush holders, respectively, and through which electric power is supplied to the primary and secondary brushes. In particular, the feature of the tandem AC generator for vehicle according to the present invention based on a brush structure in which plural brushes are placed or arranged along a circumference direction of the slip ring or the rotary shaft is that the primary and secondary holders are formed separately to each other and tightly integrated into a single body through the connection metal members. It is thereby possible to simplify the configuration of the brush assembly in the tandem AC generator based on the brush structure in which plural brushes are placed along the circumference direction of the slip ring or the rotary shaft. This configuration of the brush structure of the tandem AC generator of the present invention is capable of further increasing a durable quality and anti-vibration capability of the brush assembly. The important matter of the brush structure in which plural brushes are placed or arranged along the circumference direction of the slip ring is that the brush accommodating holes of both of the brush holders are placed in an approximate radius direction of the slip ring, namely, in a centripetal direction thereof. The integration of both of the brush holders into a single body has an adequate durability and anti-vibration capability. However, because the integration of both brush holders near to each other provides that the brush accommodating holes become open toward the approximate radius direction of or the centripetal direction of the slip ring, it becomes difficult to pull up manufacturing dies from both of the brush holders after the completion of the molding during the manufacturing. Further, there is a possibility of selecting another manner where both of the brush holders are produced separately and independently fixed them to the housing of the tandem AC generator. This manner has a drawback of decreasing the durability or solidity and anti-vibration capability of both of the brush holders, in particular, decreasing fastening force for fastening the through-bolts of the brush holders by vibration caused by the internal combustion engine of the vehicle, for example.

On the contrary, according to the present invention, because both the brush holders near to each other along the circumferential direction are integrated together by the connection metal members which are insert-molded in the brush holders, it is possible to realize the tandem vehicle alternator based on the brush structure in which plural brushes are placed in the circumferential direction by simple manufacturing manner.

Although the brush accommodating holes of both of the brush holders are open toward the approximate radius direction or the centripetal direction of the slip ring in the tandem AC generator of the present invention, it is possible to avoid the difficulty of producing the brush assembly because of placing the brush accommodating holes of both of the brush holders in parallel to the pulling direction of the dies after the molding in the manufacturing, and because of easily aliening the opening direction of the brush accommodating holes of both of the brush holders toward the centripetal direction by bending the connection metal members. It is thereby possible to avoid the difficulty of producing the brush assembly.

In the tandem AC generator according to another aspect of the present invention, the connection metal member and the terminals are integrated in a single body. This configuration can reduce the number of components in the tandem AC generator and prevent the thermal concentration by uniform of the current density in both of the brushes.

In the tandem AC generator according to another aspect of the present invention, the connection metal member has a primary connection metal member protruded from the primary holder and a secondary connection metal member protruded from the secondary holder, and the primary connection metal member and the secondary connection metal member are welded. It is thereby possible to form the brush assembly based on the brush mechanism of placing plural brushes along the circumference direction of the slip ring.

In the tandem AC generator according to another aspect of the present invention, the primary connection metal member is insert-molded in the primary holder and the secondary connection metal member is insert-molded in the secondary holder. The primary holder and the secondary holder have a same shape and placed in line symmetry observed from the axis direction of the slip ring. This configuration enables us to use simple manufacturing equipments and can also reduce the number of manufacturing equipments including dies. In this configuration, it is preferred to form the brush holders with a same shape, which support the brushes slidingly contacted on the slip rings.

In the tandem AC generator according to another aspect of the present invention, each of the primary and secondary connection metal members is made of a metal plate and has a front end part that protrudes toward the inside of the radius direction of the slip ring and placed between the primary and secondary brushes in the circumference direction of the slip ring. This configuration enables us to perform easy welding and it is thereby possible to reduce electric resistance between the connection metal members.

In the tandem AC generator according to another aspect of the present invention, the front parts of both of the primary and secondary brush holders protrude and tightly joined to each other toward the radial direction of the slip ring at the outside from the front end part of each of the primary and secondary connection metal members.

Because this configuration tightly joins both of the primary and secondary brush holders at the outside of the front end part of each of the connection metal members in the radius direction, it is possible to protect the space formed between the front end parts of the connection metal members and the slip rings by the joint part of the primary and secondary brush holders and still further possible to protect scatter of powers, without introducing a brush cover for protection, generated between the brushes and the slip rings during the rotation of the rotary shaft.

In the tandem AC generator according to another aspect of the present invention, both of the primary and secondary brush holders are fit to each other through concave and convex parts thereof at outside of the front part of the primary and secondary connection metal members protruding toward the inside of the radius direction. This configuration can increase the ability to integrate the primary and secondary brush holders in a single body and the ability to seal the primary and secondary brush holders.

In accordance with another aspect of the present invention, there is provided a tandem AC generator for vehicle having primary and secondary brushes, a brush holder, primary and secondary brush springs, and terminals. The primary and secondary brushes are slidingly contacted to a common slip ring and placed near to each other in a circumference direction of the common slip ring. The brush holder has primary and secondary brush holders and the primary and secondary brush holders have a same shape and separated to each other. The primary and secondary brush holders independently accommodate and support the primary and secondary brushes so as to move the primary and secondary brushes in a radius direction of the slip ring. The primary and secondary brush springs, accommodated in the primary and secondary brush holders, spring-bias those spring-energy to the primary and secondary brushes, independently, toward the radius direction of the slip ring. End parts of the terminals are insert-molded into the primary and secondary brush holders, respectively, in order to fix the terminals thereto, and through which electric power is supplied to the primary and secondary brushes. The configuration described above can simplify the manufacturing equipments and reduce the number of those manufacturing equipments including dies. In this case, it is preferred to independently produce the primary and secondary brush holders for accommodating the independent brushes slidingly contacted onto the slip rings in addition to the common slip ring.

In accordance with another aspect of the present invention, there is provided a method of producing a brush assembly in a tandem AC generator for vehicle. The brush assembly has primary and secondary brushes and a brush holder. The primary and secondary brushes are placed near to each other in a circumference direction of a common slip ring and slidingly contacted to the common slip ring. The brush holder is composed of primary and secondary brush holders separated to each other independently accommodating the primary and secondary brushes and movably supporting the primary and secondary brushes in the radius direction of the slip ring. The above method has steps of performing insert-molding of both ends of a connection metal member into the primary and secondary brush holders, respectively, in order that accommodating holes of the primary and secondary brush holders, into which the primary and secondary brushes are accommodated, are in parallel to each other. The connection metal member is then bent so that a center axis of the brush accommodating hole of each of the primary and secondary brush holders extends toward approximate radius direction. Because the connection metal member is bent so that a center axis of the accommodating hole of each of the primary and secondary brush holders extends toward approximate radius direction after the formation of the brush holders by the insert-molding under the condition of arranging the primary and secondary brush holders in parallel to each other, it is possible to easily perform the insert-molding of the brush assembly in the manufacturing of the tandem AC generator for vehicle.

In accordance with another aspect of the present invention, there is provided a tandem AC generator for vehicle having a common slip ring, a pair of independent slip rings, a common brush, and independent brushes. Through the common slip ring, different field currents are independently supplied to a pair of field windings. Through the pair of independent slip rings, the different field currents flow independently. The common brush is slidingly contacted to the common slip ring. The independent brushes are forcedly and independently contacted to the independent slip rings, respectively. In the tandem AC generator, a circumferential width of the common brush is wider than that of each of the independent brushes. This configuration of the tandem AC generator of the present invention can avoid the manufacturing difficulty caused in the brush mechanism of placing plural brushes along the circumference direction of the slip ring or rotary shaft involved in the related art, and further to suppress the increase of the length in the axis direction of the tandem AC generator as well as the feature of reducing the current density between the common brush and the common slip ring and the current density of the inside thereof.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
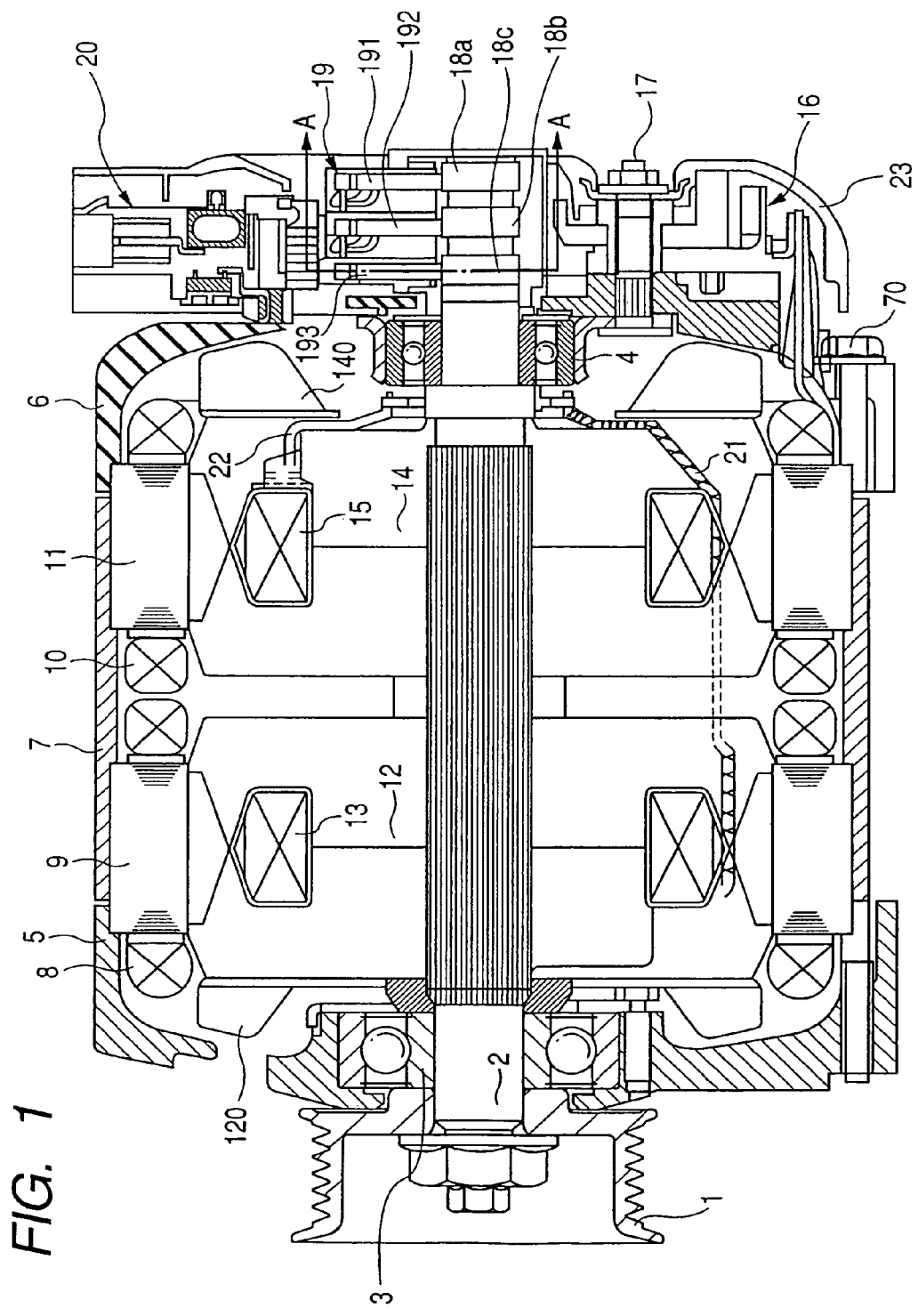
FIG. 1 is a cross sectional view showing a tandem AC generator (or a tandem vehicle alternator) in the axis direction of a rotor shaft according to a first embodiment of the present invention.

Hereinafter, various embodiments and modifications of a tandem AC (Alternating Current) generator for vehicle (or a tandem vehicle alternator for short) according to the present invention will be described with reference to the accompanying drawings. In the following description of the various embodiments, like reference characters or numerals designate like or equivalent component parts throughout the several diagrams.

First Embodiment

Entire Structure

A description will now be given of the entire structure of the tandem AC generator for vehicle (hereinafter, also referred to as "the tandem vehicle alternator" for short) with reference to FIG. 1.

FIG. 1 is a cross sectional view showing the tandem AC generator in the axis direction of a rotor shaft 2 according to the first embodiment of the present invention. Some parts of the tandem vehicle alternator having a complicated configuration are designated by hatchings and the detailed configuration thereof is omitted from FIG. 1.

The tandem vehicle alternator is composed mainly of the rotary shaft 2 fixed to a pulley 1, bearings 3 and 4 which rotatably support the rotary shaft and transmit a rotation energy, a front housing 5, and a rear housing 6. The front housing 5 and the rear housing 6 are made of non-magnetic material. Reference number 7 designates the center housing. The center housing 7, the front housing 5, and the rear housing 6 are connected together by some through-bolts 70.

The front housing 5 and the rear housing 6 support a primary armature and a secondary armature placed along the axis direction of the rotary shaft 2. The primary armature has a lamination iron core composed of laminated iron plates on which a pair of armature coils 8 is wound. Like the primary armature, the secondary armature has a lamination iron core 11 composed of laminated iron plates on which a pair of armature coils 10 is wound.

The front housing 5 and the center housing 7 forcedly press the lamination iron core 9 in the axis direction. The center housing 7 and the rear housing 6 forcedly support the lamination iron core 11. The front housing 5, the rear housing 6, and the center housing 7 are forcedly fixed in the axis direction by the pressure force of the through bolts 70.

A primary field rotor is arranged in the radius direction of the inside of the lamination iron core 9, and a secondary field rotor is arranged in the radius direction of the inside of the lamination iron core 11. The primary field rotor is composed of a Lundell type field core 12 and a field winding 13 wound on the Lundell type field core 12. The secondary field rotor is composed of a Lundell type field core 14 and a field winding 15 wound on the Lundell type field core 14.

Each of the armature coils 8 and 10 in the tandem vehicle alternator generates a three phase AC voltage. Each of a pair of three phase rectifiers 16, namely, a primary rectifier 16 and a secondary rectifier 16 (designated by the same reference number 16, and FIG. 1 shows only one rectifier), rectifies the three phase AC voltage and independently outputs the rectified voltage to outside devices of the tandem vehicle alternator.

FIG. 1 shows, without use of hatching, the three phase rectifier 16 which rectifies and outputs the three phase AC voltage generated by the armature coil 10. In particular, FIG. 1 shows only one of the three phase rectifiers 16 because one rectifier 16 is hidden by the other rectifier 16.

The pair of the three phase rectifiers 16 is fixed at the outside surface of the rear housing 6 by the through bolts 17.

The Lundell type field cores 12 and 14 are faced to each other and fixed to the rotary shaft 2 in the axis direction in order. Each Lundell type field core is composed of a pair of half cores, and each half core is composed of a boss part, a disk part, and a claw pole part having plural claw poles.

The boss part has a cylindrical shape forcedly fixed to the rotary shaft 2. The disk part is a column part protruded form the end of the boss part. The claw pole part has plural claw poles which extend from the outside end in the radius direction of the disk part toward the axis direction of the rotary shaft 2. In FIG. 1 reference number 120 designates cooling fans fixed to the front end surface of the Lundell type field core 12, and 140 denotes cooling fans fixed to the rear end surface of the Lundell type field core 14.

(Electric Components)

The tandem vehicle alternator is equipped with three slip rings 18a, 18b, and 18c at the rear end part of the rotary shaft 2 extending from the rear part through the end wall of the rear housing 6. Those three slip rings 18a, 18b, and 18c are forcedly fixed to the rear end part of the rotary shaft 2 at a regular interval.

A brush assembly 19 and a regulator 20 are fixed to the outer end surface of the rear housing 6. An end cover made of resin surrounds the outer end surface of the rear housing 6. The pair of the three phase rectifiers 16, the three slip rings 18a, 18b, 18c, the brush assembly 19 and the regulator 20 are separately arranged in the space area as an electric-component room formed by the outer end surface of the rear housing 6 and the end cover 23.

FIG. 1 shows the cross section of the brush assembly 19, the regulator 20, and the end cover 23 in the electric part room without hatching because they have a complicated configuration.

The tandem vehicle alternator of the first embodiment described above is driven by an internal combustion engine (not shown) mounted on a vehicle, generates and outputs electric power to electric components mounted on the vehicle such as a battery and electric loads. Because those mechanism and operation of the tandem vehicle alternator have been well and widely known, the explanation of those is omitted here for brevity.

(Brush Assembly)

A description will now be given of the configuration of the brush assembly 19 or a brush structure in the tandem vehicle alternator according to the first embodiment of the present invention with reference to FIG. 1 and FIG. 2.

Figure 2:
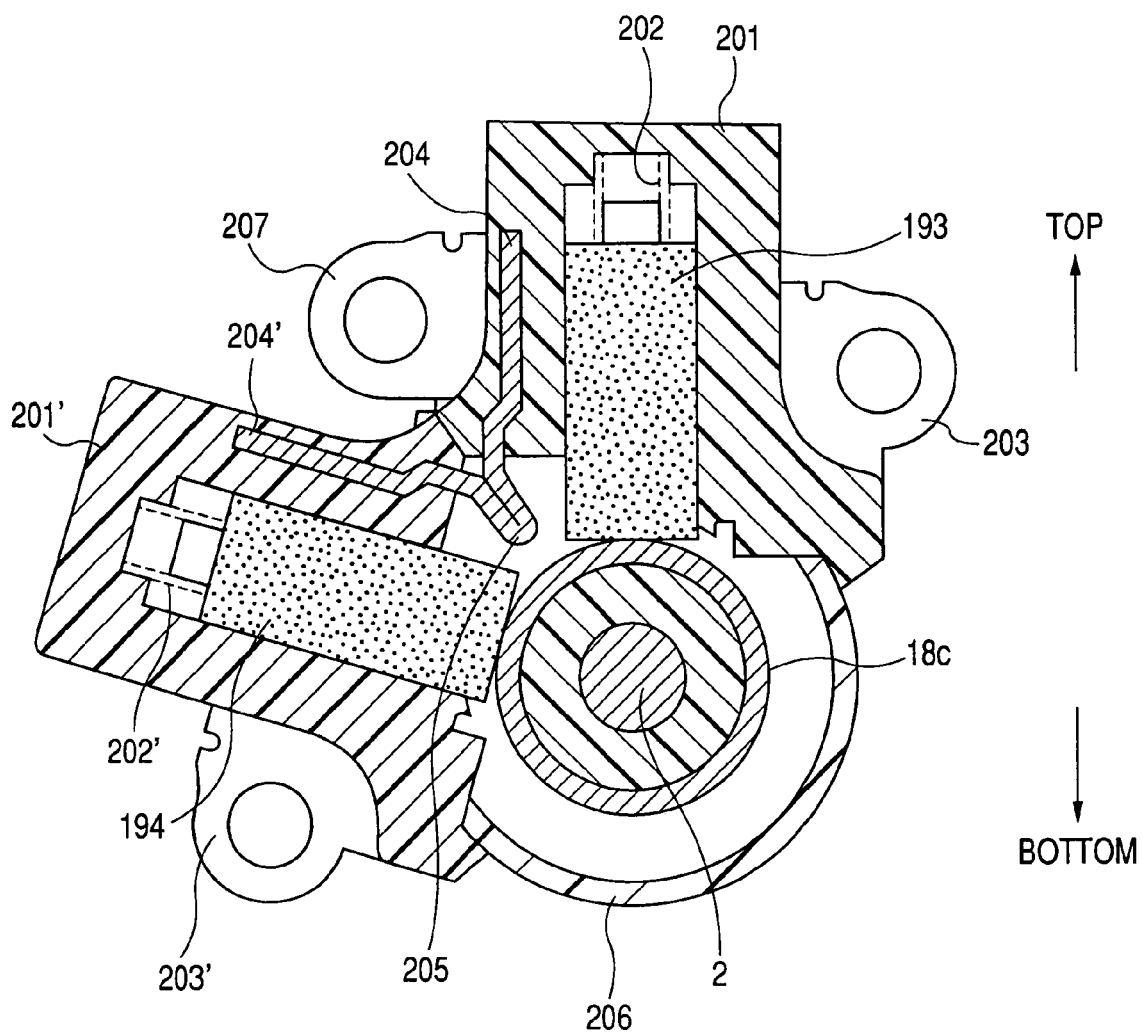
FIG. 2 is a cross sectional view showing a brush assembly, along the line A-A, namely, in the radial direction of the brush assembly in the tandem vehicle alternator shown in FIG. 1.

FIG. 2 is a cross sectional view showing the brush assembly 19, along the line A-A, namely, in the radial direction of the brush assembly in the tandem vehicle alternator shown in FIG. 1.

Both ends of the field winding 13 are independently connected to the slip rings 18a and 18c, respectively through a pair of lead wires 21. Both ends of the field winding 15 are independently and electrically connected to the slip rings 18b and 18c, respectively through a pair of lead wires 22.

The brush assembly 19 has a brush 191 slidingly contacted to the slip ring 18a, a brush 192 slidingly contacted to the slip ring 18b, and a pair of brushes 193 and 194 slidingly contacted to the slip ring 18c. The brushes 191, 192, and 193 are extending toward the upper and bottom directions in FIG. 1. The brush 194 is extending toward a slant upward direction in FIG. 2.

FIG. 1 shows the brush 193, the brushes 191 and 192, but, does not show the brush 194. The electric power is supplied to the brush 191 through a transistor capable of performing on-off for a field current at a primary high-voltage side of the regulator 20. The electric power is also supplied to the brush 192 through a transistor capable of performing on-off for a field current at a secondary high-voltage side of the regulator 20. Both of the brushes 193 and 194 are grounded.

A description will now be given of the arrangement of the brushes 193 and 194 in the brush assembly 19 in the tandem vehicle alternator with reference to FIG. 2.

The brush 193 is movably accommodated, along the radius direction of the brush assembly 19, in a brush accommodation hole of a brush holder 201. Reference number 202 designates a brush spring which spring-biases (or forcedly applies) spring-energy to the brush 193 toward the slip ring 18c. A terminal 203 is insert-molded in the brush holder 201.

A protruding part of the terminal 203 protruded to the outside from the brush holder 201 forms an external connection terminal which is fixed to the outer end surface of the rear housing 6 by screws or bolts (omitted from drawings). The terminal 203 supplies electric power to the brush 193 through a pigtail.

A connection metal member 204 integrated with the terminal 203 to a single body is insert-molded to the brush holder 201. As shown in FIG. 2, the connection metal member 204 is placed in approximately parallel to the brush 193, and the front tip of the connection metal member 204 is protruding from the brush holder 201 toward the radial direction of the brush assembly 19.

The brush 194 is movably accommodated, along the radius direction of the brush assembly 19, in a brush accommodation hole of a brush holder 201'. Reference number 202' designates a brush spring which spring-biases spring-force to the brush 194 to the slip ring 18c. A terminal 203' is insert-molded in the brush holder 201'.

A protruding part of the terminal 203' protruded to the outside from the brush holder 201' forms an external connection terminal which is fixed to the outer end surface of the rear housing 6 by screws or bolts (not shown). The terminal 203' supplies the electric power to the brush 194 through a pigtail. A connection metal member 204' integrated with the terminal 203' to a single body is insert-molded to the brush holder 201'. As shown in FIG. 2, the connection metal member 204' is placed in approximately parallel to the brush 194, and the front tip of the connection metal member 204' is protruding from the brush holder 201' toward the radial direction of the brush assembly 19. The front end parts of both of the connection metal members 204 and 204' are adhered and welded.

Reference number 206 designates a holder cover made of resin formed in a partially cylindrical shape. The holder cover 206 and the brush holders (holder part defined in claims of the present invention) 201 and 201' accommodate the slip ring 18c. At the position of each of the slip rings 18a and 18b, the holder cover 206 and the brush holder 201 accommodates the slip rings 18a and 18b.

In the configuration of the first embodiment, the brush holder 201 accommodates the brushes 191, 192, and 193, and the brush holder 201' accommodates the brush 194. Reference number 207 denotes a terminal electrically connected to the brush 192. In FIG. 1, the terminal electrically connected to the brush 191 is placed behind the terminal 207.

Modification Example

The brush holder 201 accommodates the three brushes 191, 192, and 193 in the configuration according to the first embodiment described above. The present invention is not limited by this configuration. For example, it is possible that three brush holders of a same shape are made, each brush holder accommodates each brush, and the three brush holders are fastened to each other. According to the above configuration of the brush holders, it is possible to achieve simplification of manufacturing equipments such as dies and to reduce the number of components of the tandem vehicle alternator.

It is preferred that the brush holder 201' accommodating the brush 194 is made with the same shape of the three brush holders described above and arranged in mirror symmetry (line symmetry) as shown in FIG. 2. This configuration can achieve the simplification of the manufacturing equipment including die, and can reduce the number of the components. It is thereby possible to achieve simplification of manufacturing equipments including dies and to reduce the umber of components of the tandem vehicle alternator.

Although the above configuration uses the terminal 203 and the connection metal member 204 as different parts, it is acceptable to form or integrate them into a single component. Similarly, it is also possible to integrate the terminal 203' and the connection metal member 204' into a single component. This can reduce the number of the total components of the tandem vehicle alternator and unify the current density of both brushes in order to avoid concentration of thermal energy generated by the current flow.

Figure 3:
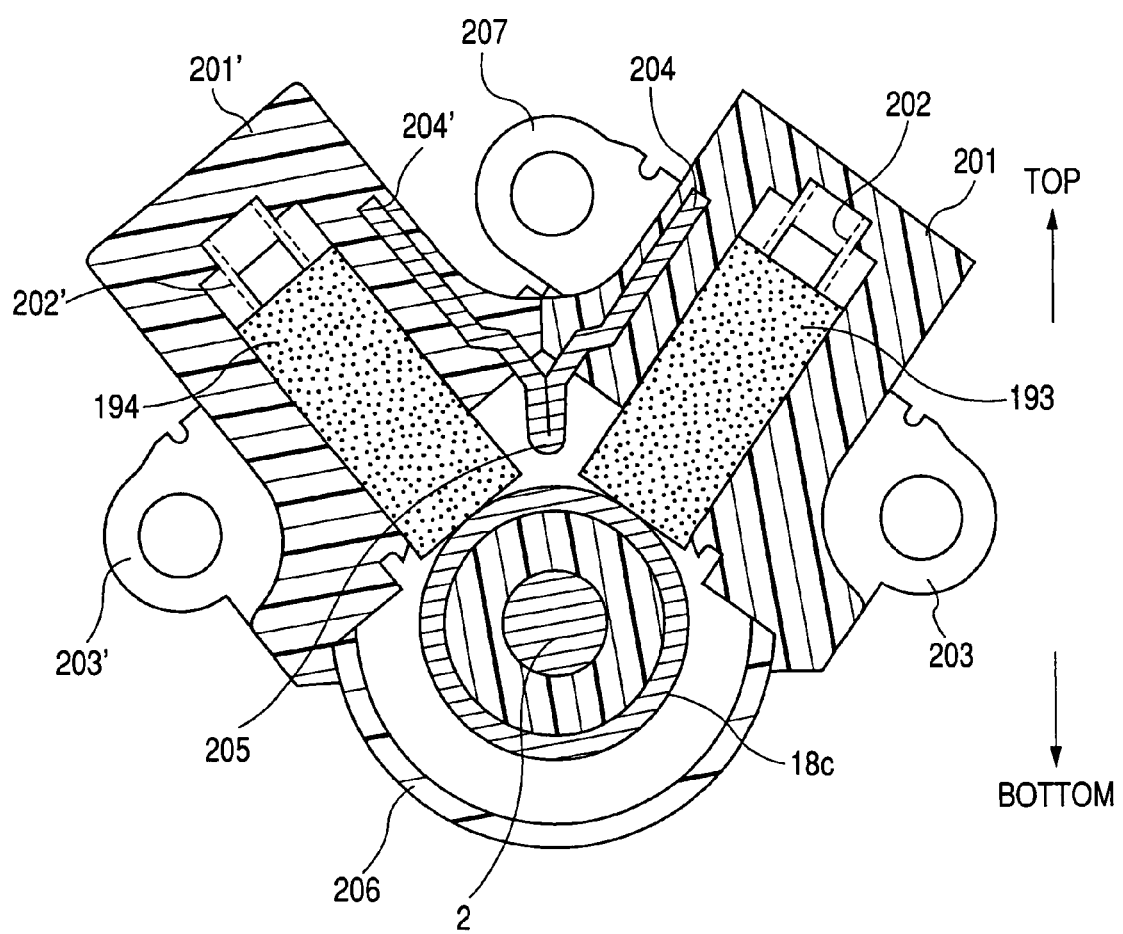
FIG. 3 is a cross sectional view showing a modified configuration of the brush assembly in the tandem vehicle alternator according to the first embodiment of the present invention.

Still further, as shown in FIG. 3, it is possible to slant upward the brush holder 201 and the brush holder 201' and to place them in a character "V" shaped arrangement where they have an approximate same angle to a vertical line. It is also acceptable to integrate the connection metal members 204 and 204' into a single component by fastening them instead of using the insert-molded connection metal members 204 and 204'. The positions of the connection metal members 204 and 204' are changeable so long as they tightly fasten the brush holders 201 and 201'.

(Effects)

Hereinafter, a description will now be given of the effects of the brush assembly 19 in the tandem vehicle alternator according to the first embodiment of the present invention.

At first, the first embodiment has the configuration of spring-biasing the pair of the brushes 193 and 194 onto the slip ring 18c in different angles around the slip ring 18c in order to electrically connect the field windings 13 and 15 to the slip ring 18c. That is, the first embodiment does not take the related-art configuration of electrically connecting both of the field winding 13 and 15 to a single external connection terminal corresponding to a single brush. The first embodiment takes the configuration of electrically connecting the brushes 193 and 194 to the different terminals 203 and 203', respectively. The configuration of the brush assembly in the tandem vehicle alternator of the first embodiment can reduce the number of components of the tandem vehicle alternator and achieve simplification for the structure of the brush assembly.

Still further, because the connection metal members 204 and 204' of a same shape are welded at a welding part 205 in order to tightly fasten both of the brush holders 201 and 201' in a single body. This can improve vibration resistance of the brush holders 201 and 201'.

Furthermore, the first embodiment has the configuration in which the connection metal members 204 and 204' is made of metal plate members, each of which has a front end part (corresponding to the welding part 205) which protrudes toward the inside of the radius direction. The main surfaces of those front end parts are tightly adhered together in the radius direction. This configuration permits easy electric welding and can reduce the electric resistance between the connection metal members 204 and 204'.

As shown in FIG. 2, the brush holders (holder parts) 201 and 201' made of resin are positioned outside of the front tip ends of the connection metal members 204 and 204' (a first connection metal member and a second connection metal member in claims, respectively) and tightly adhered to each other. This configuration of the first embodiment accommodates the front tip end parts of the connection metal members 204 and 204' and the slip ring 18c without placing additional brush cover between the brush holders 201 and 201' in the outside of the radius direction of the connection metal members 204 and 204'.

Second Embodiment

A description will be given of a method of producing a brush assembly 19' in the tandem vehicle alternator according to the second embodiment of the present invention with reference to FIG. 4 and FIG. 5.

Figure 4:
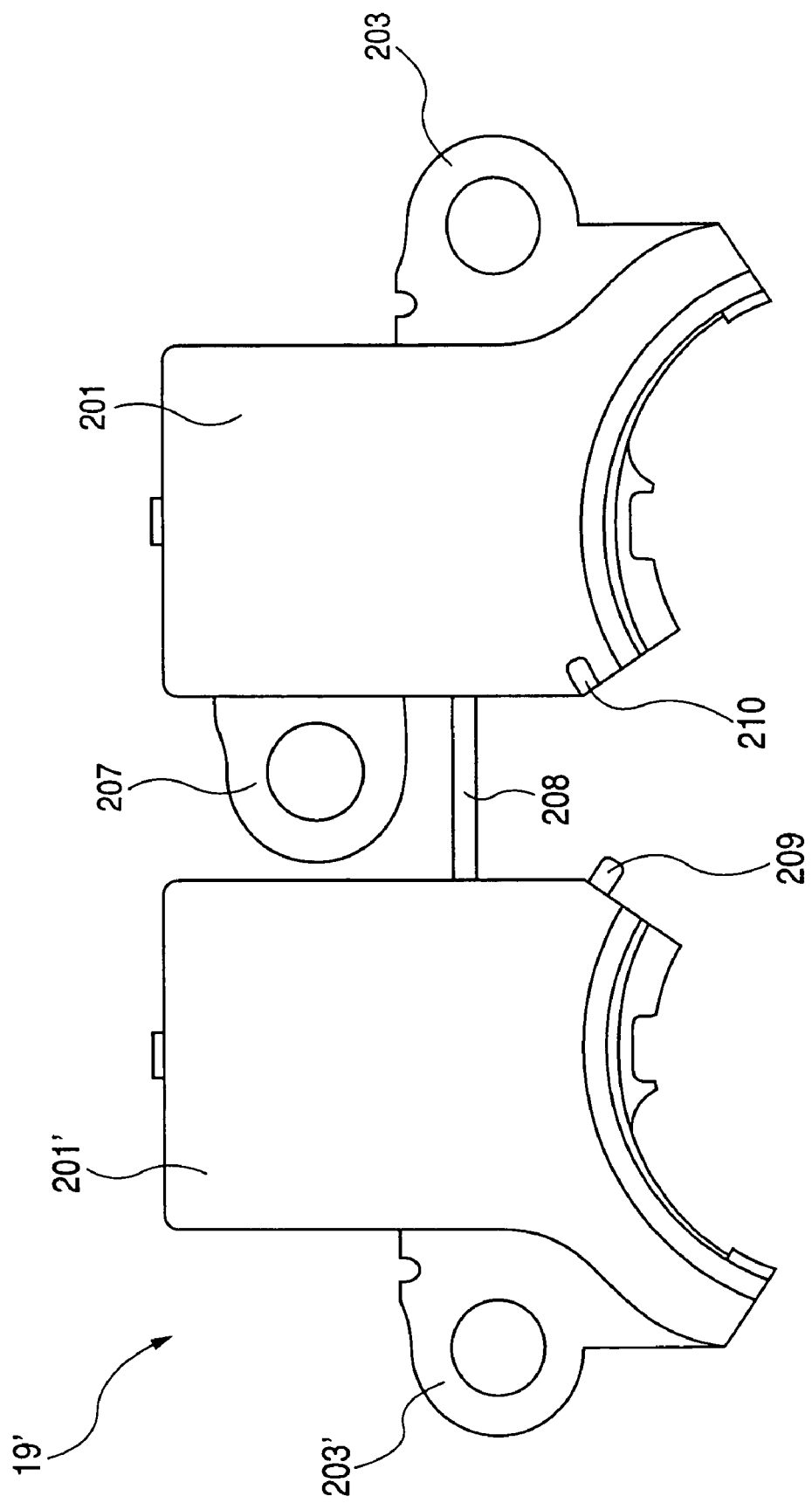
FIG. 4 is a view showing a state of a brush assembly, immediately after the completion of a step of inserting the brush holders in the brush assembly observed toward the axis direction from the rotor in the tandem vehicle alternator according to the second embodiment of the present invention.

FIG. 4 is a view showing a state of a brush assembly 19', immediately after the completion of a step of inserting the brush holders 201 and 201' in the brush assembly observed toward the axis direction from the rotor in the tandem vehicle alternator according to the second embodiment of the present invention. FIG. 5 is a view showing an arrangement of the brush assembly 19' after the completion of a step of producing the brush assembly 19' in the tandem vehicle alternator according to the second embodiment of the present invention.

Figure 5:
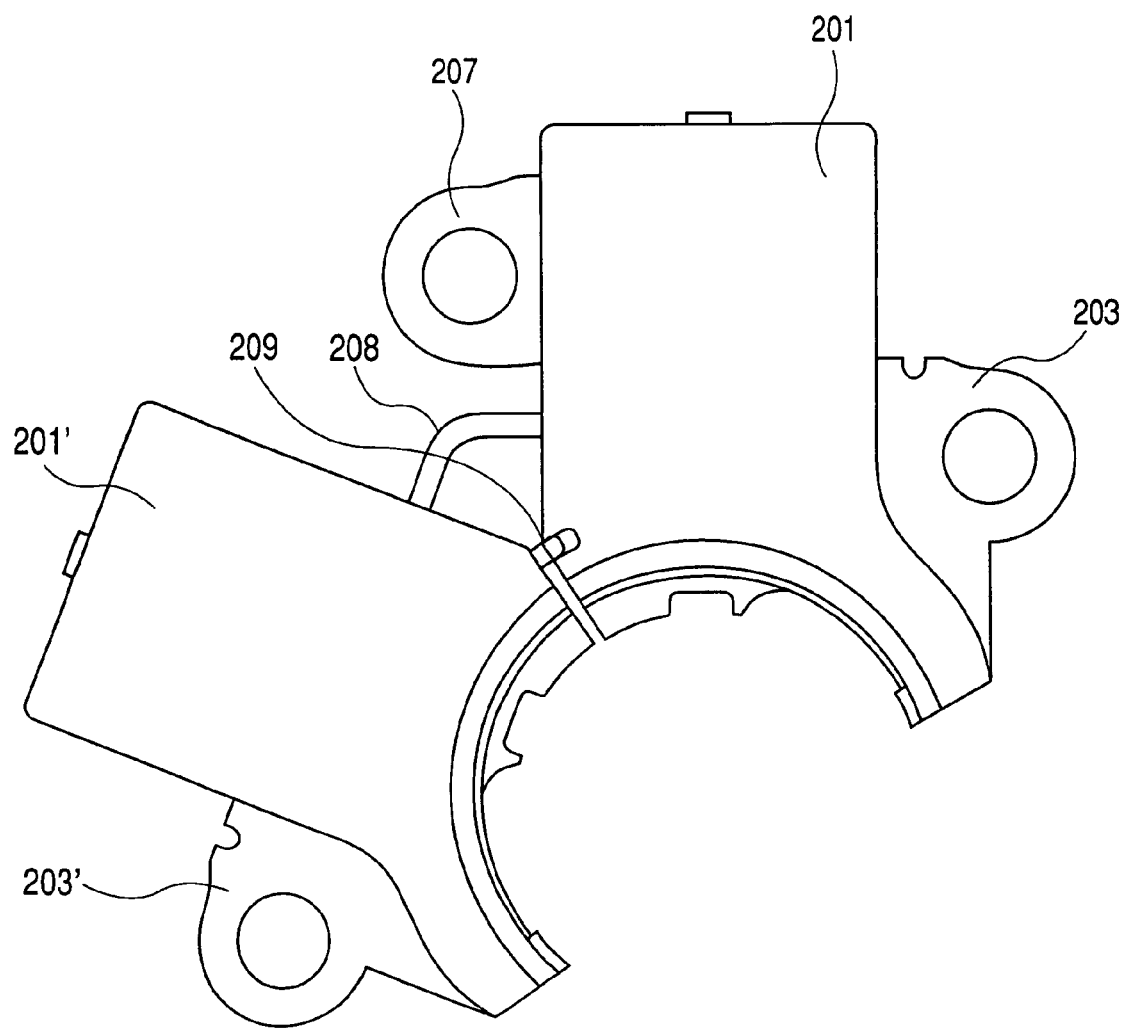
FIG. 5 is a view showing an arrangement of the brush assembly after the completion of a step of producing the brush assembly in the tandem vehicle alternator according to the second embodiment of the present invention.

The brush assembly in the configuration shown in FIG. 4 and FIG. 5 has a connection metal member 208 instead of the connection metal members 204 and 204' used in the configuration shown in FIG. 2. The connection metal member 208 and the brush holders 201 and 201' are integrated in a single body by the insert-molding.

As shown in FIG. 4, during the molding, the brush holders 201 and 201' are placed in parallel to each brush accommodating holes and the connection metal member 208 is placed perpendicular in the extending direction of the brush accommodation hole. By performing the insert-molding under this situation, it is possible to easily detach the dies from the brush holders after the completion of the insert-molding.

Each of the center axis of the brush holder 201 and the center axis of the brush holder 201' becomes the centripetal direction when the connection metal member 208 is bent after the completion of the insert-molding.

Further, in the second embodiment of the present invention, a protrusion part (or a concave part) 209 and a hole part (or a convex part) 210 shown in FIG. 4 are formed on the contact surfaces of the brush holder 201 and 201' in order to fit them together by bending the connection metal member 208 (see FIG. 5). This configuration shown in FIG. 4 and FIG. 5 can tightly contact the contact surfaces of the brush holders 201 and 201' to each other after the bending.

Modification Example

Figure 6:
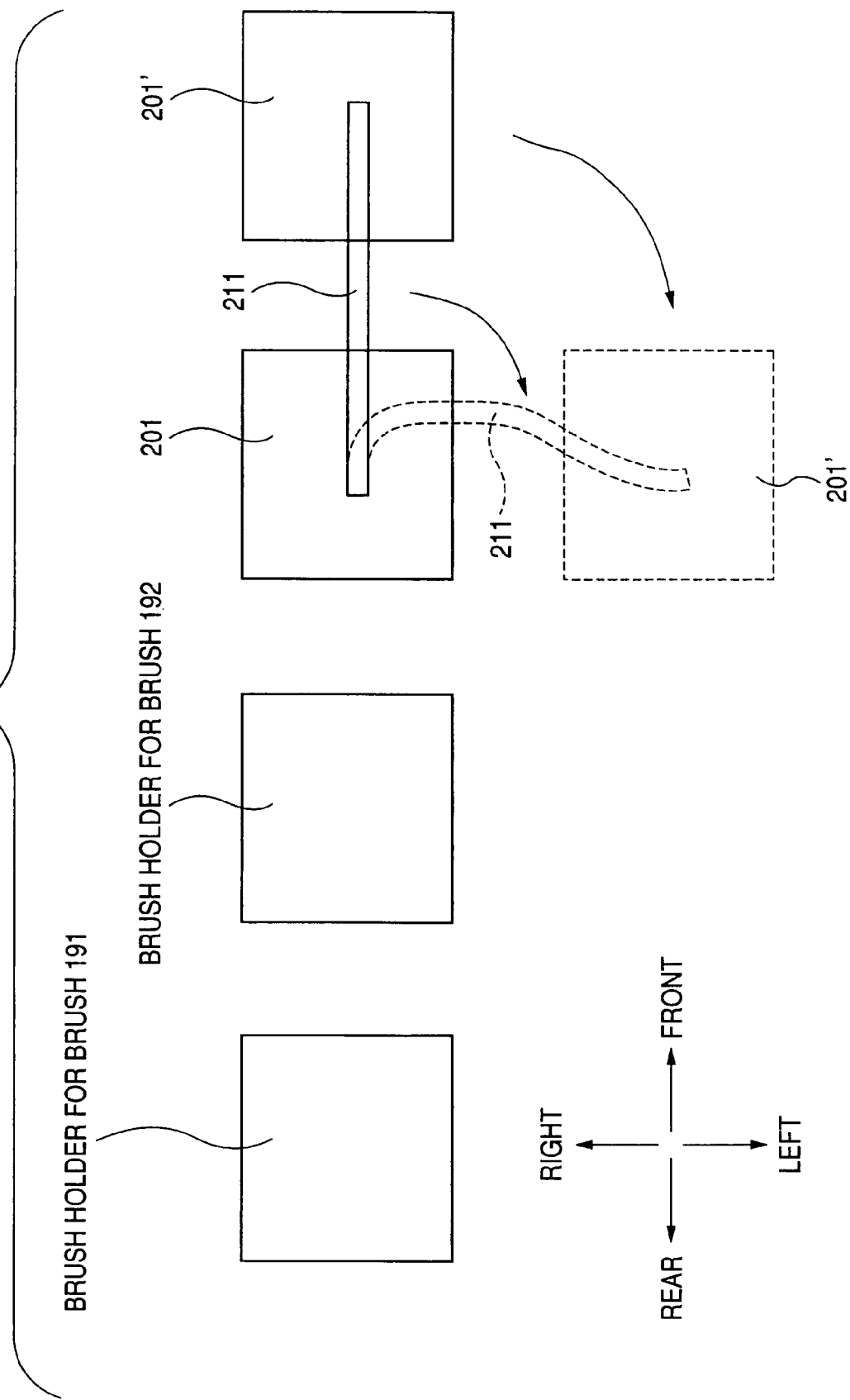
FIG. 6 is a schematic view showing a modified configuration of the brush assembly in the tandem vehicle alternator according to the second embodiment of the present invention.

In the second embodiment, the brush holder 201' is bent to the brush holder 201 toward the circumference direction of the slip ring, namely, of the rotary shaft 2. FIG. 6 is a schematic view showing a modified configuration of the brush assembly in the tandem vehicle alternator according to the second embodiment of the present invention. As shown in FIG. 6, instead of the configuration shown in FIG. 4 and FIG. 5, it is acceptable to rotate the brush holder 201' at a right angle to the center axis of the brush accommodation hole of the brush holder 201. In this case, a connection metal member 211 for connecting both of the brush holders 201 and 201' at the top parts of the brush holders 201 and 201'.

Third Embodiment

A description will be given of a brush assembly in the tandem vehicle alternator according to the third embodiment of the present invention with reference to FIG. 7.

Figure 7:
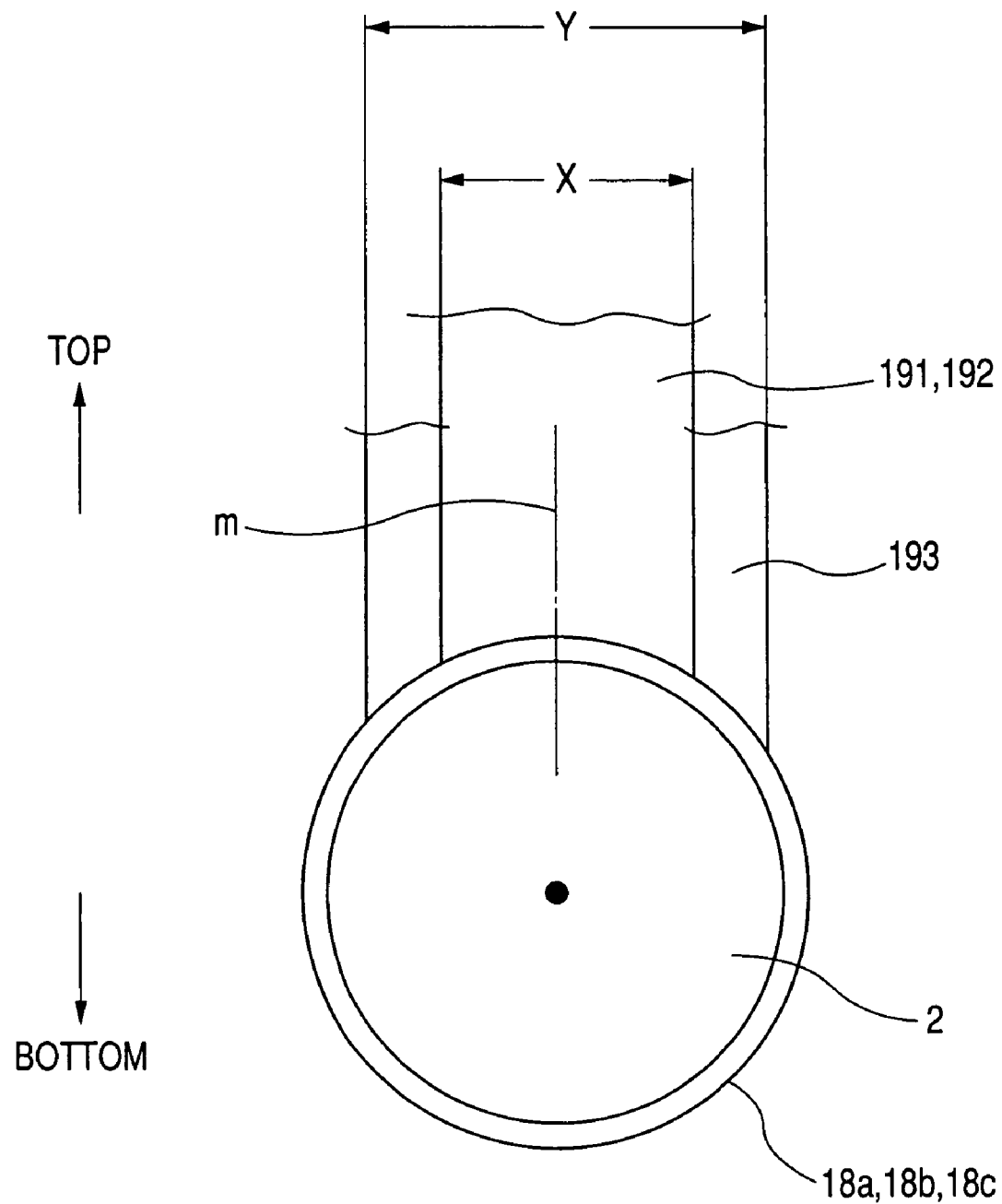
FIG. 7 is a view showing an arrangement of a brush assembly in a tandem vehicle alternator according to a third embodiment of the present invention.

FIG. 7 is a view showing an arrangement of the brush assembly in a tandem vehicle alternator according to a third embodiment of the present invention. FIG. 7 shows the slip rings 18a, 18b, and 18c, and the brushes 191, 192 and 193 corresponding to the slip rings 18a, 18b, and 18c, respectively, observed from the rear side toward the front side of the axis direction of the rotary shaft 2. Those slip rings 18a, 18b, and 18c are tightly fastened to the rear end part of the rotary shaft 2 extending from the rear side of the rear housing. In precisely, the slip rings 18b and 18c are hidden behind the slip ring 18a, and the brush 192 is hidden behind the brush 191.

In the configuration of the third embodiment shown in FIG. 7, it is so formed that the width "Y" of the brush 193 as the common-use brush in the circumference direction (that is, a width along right and left directions in FIG. 7) is wider than the width "X" of the brushes 191 and 192 as an independent-use brush. As shown in FIG. 7, the center line "m" of each of the brushes 191, 192, and 193 contacted on the slip rings 18a, 18b, and 18c, when observed from the right and left directions perpendicular to top and bottom directions in FIG. 7, coincide to each other. This configuration can reduce increasing of the current density of a large current which flows through the brush 193.

It is so formed that the width "Y" of the brush 193 in the circumference direction (in precisely, along the right and left directions in FIG. 7) is 40 to 70% up from the width "X" of each of the brushes 191 and 192 in the circumference direction.

The brushes 191, 192, and 193 have the same width in the axis direction. It is also possible to form that the width of the brush 193 in the axis direction is 10 to 30% up from the width of each of the brushes 191 and 192 in the axis direction. This configuration can suppress the increase of the current density of the brush 193 while suppressing the increase of the length of the brush assembly in the axis direction.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A tandem AC generator for a vehicle comprising:
   a primary brush and a secondary brush which are slidingly contacted with a common slip ring and placed near to each other in a circumference direction of the common slip ring;
   a brush holder comprising a primary brush holder and a secondary brush holder separated from each other and independently accommodating and supporting the primary and secondary brushes so as to move the primary brush and the secondary brush in a radius direction of the common slip ring, and integrated in a single body by a connection metal member whose both ends are insert-molded in the primary and secondary brush holders, respectively; and
   a primary brush spring and a secondary brush spring, accommodated in the primary brush holder and the secondary brush holder, spring-biasing those spring-energy to the primary and secondary brushes, independently, toward the radius direction of the common slip ring; and
   terminals fixed and electrically connected to the primary and secondary brush holders, respectively, and through which electric power is supplied to the primary and secondary brushes,
   wherein the connection metal member comprises a primary connection metal member protruding from the primary brush holder and a secondary connection metal member protruding from the secondary brush holder toward the common slip ring, and the primary connection metal member and the secondary connection metal member are welded together.

2. The tandem AC generator for the vehicle according to claim 1, wherein the connection metal member and the terminals are integrally formed in a single body.

3. The tandem AC generator for the vehicle according to claim 1, wherein the primary brush holder in which the primary connection metal member is insert-molded and the secondary brush holder in which the secondary connection metal member is insert-molded have a same shape and are placed in line symmetry when observed from the axis direction of the common slip ring.

4. The tandem AC generator for the vehicle according to claim 1, wherein the primary and secondary connection metal member are made of a metal plate, and a front end part of the primary connection metal members and a front end part of the secondary connection metal member protrude from the primary brush holder and the secondary brush holder, respectively, toward the inside in the radius direction of the common slip ring, and the primary connection metal member and the secondary connection metal member are placed between the primary brush and the secondary brush observed in circumference of the common slip ring, and the front end part of the primary connection metal member and the front end part of the secondary connection metal member are connected to each other.

5. The tandem AC generator for the vehicle according to claim 1, wherein the primary brush holder and the secondary brush holder are tightly joined to each other at an outside in the radius direction of the common slip ring observed from a front end part of the primary connection metal member and a front end part of the secondary connection metal member which protrude from the primary brush holder and the secondary brush holder, respectively, toward the inside in the radius direction of the common slip ring.

6. The tandem AC generator for the vehicle according to claim 3, wherein the primary brush holder and the secondary brush holder are tightly joined to each other at an outside in the radius direction of the common slip ring observed from a front end part of the primary connection metal member and a front end part of the secondary connection metal member which protrude from the primary brush holder and the secondary brush holder, respectively, toward the inside in the radius direction of the common slip ring.

7. The tandem AC generator for the vehicle according to claim 4, wherein the primary brush holder and the secondary brush holder are tightly joined to each other at an outside in the radius direction of the common slip ring observed from the front end part of the primary connection metal member and the front end part of the secondary connection metal member.

8. The tandem AC generator for vehicle according to claim 5, wherein both of the primary and secondary brush holders are fit to each other through concave and convex parts.

9. The tandem AC generator for vehicle according to claim 6, wherein both of the primary and secondary brush holders are fit to each other through concave and convex parts.

10. The tandem AC generator for vehicle according to claim 7, wherein both of the primary and secondary brush holders are fit to each other through concave and convex parts.

* * * * *